United States Patent [19]

Chiu et al.

[11] 3,935,320

[45] Jan. 27, 1976

[54] TUBULAR CELLULOSIC CASING WITH CATIONIC THERMOSETTING RESIN COATING

[75] Inventors: Herman S. Chiu, Chicago; Jerome J. M. Rasmussen, South Stickney Township, Cook County, both of Ill.

[73] Assignee: Union Carbide Corporation, New York, N.Y.

[22] Filed: Apr. 4, 1973

[21] Appl. No.: 347,685

[52] U.S. Cl. .................. 426/105; 426/135; 426/89; 426/133; 426/284; 426/289; 426/332
[51] Int. Cl.² ............................................ A23B 4/00
[58] Field of Search ............. 426/92, 105, 138, 140, 426/135, 326, 413, 278, 133, 289, 332; 138/118.1; 427/209, 230

[56] References Cited
UNITED STATES PATENTS

| | | | |
|---|---|---|---|
| 2,346,417 | 4/1944 | Cornwell | 426/135 |
| 2,811,453 | 10/1957 | Childs | 426/92 |
| 2,864,708 | 12/1958 | Tebbens | 426/105 |
| 2,953,462 | 9/1960 | Keil | 426/105 |
| 2,973,274 | 2/1961 | Langmaack | 426/277 |
| 3,378,379 | 4/1968 | Shiner | 138/118.1 |
| 3,427,169 | 2/1969 | Rose | 426/133 |
| 3,653,928 | 4/1972 | Rose | 426/135 |
| 3,695,904 | 10/1972 | Coleman | 117/12 |
| 3,743,521 | 7/1973 | Rasmussen | 427/209 |

*Primary Examiner*—Norman Yudkoff
*Assistant Examiner*—Hiram H. Bernstein
*Attorney, Agent, or Firm*—Franklyn Schoenberg

[57] ABSTRACT

A tubular cellulosic sausage casing such as a tubular fibrous casing particularly suitable for use with dry sausage such as Genoa salami has a coating bonded to the interior and exterior surfaces thereof of a cured cationic thermosetting resin. A tubular cellulosic sausage casing having at least about 0.45% by weight of said cured cationic thermosetting resin bonded to the surfaces of said casing exhibits resistance to degradation by cellulolytic enzymes.

14 Claims, No Drawings

TUBULAR CELLULOSIC CASING WITH CATIONIC THERMOSETTING RESIN COATING

This invention relates to food casing and more particularly to tubular food casings that exhibit improved resistance to degradation in the presence of cellulolytic enzymes and to the method of making the same.

A wide variety of processed meat products employing many different recipes and processing conditions are commercially prepared and, in general, tubular food casings play an important part in the manufacture of these products.

In recent years, food casings formed from synthetic materials and particularly regenerated cellulose have been found to be highly desirable and are used extensively in the preparation of processed meat products such as sausage products replacing, to a large extent, casings formed of natural materials or animal products. The use of different types of food casing may be required for the processing of different categories of meat products and it is common to utilize tubular food casing referred to as "fibrous casing" in the preparation of a variety of sausage products. Fibrous casing consists of a fibrous web formed into a tube and impregnated with regenerated cellulose.

A common feature of most varieties of sausage products is that the mixture of comminuted meat, spices and seasoning of which the sausage is made up, generally called the emulsion, is stuffed into a casing and then processed and stored in the casing. However, the differences in emulsion recipes and modes of processing make it difficult to provide a casing that is suitable for all types of sausage product. For example, sausage products known as dry sausages such as salami, summer sausage, Lebanon bologna and the like are usually processed by curing and drying for extended periods of time rather than cooking. To permit moisture to be removed and enable curing agents such as smoke to be accessible to the sausage, the casing must be permeable to gases. On the other hand, liver and other moist types of sausage require that moisture be retained during processing and storage necessitating the use of casings that are substantially impermeable.

Fibrous casings have been developed and are commercially available that exhibit properties making them suitable for use with many varieties of sausage products. Casing of the type described, for example, in U.S. Pat. No. 3,378,379 exhibits the permeability and adhesion characteristics that are required in the processing of a wide variety of dry sausages and another type of casing as described, for example, in U.S. Pat. No. 2,961,323 exhibits low moisture and gas permeability and is thereby suitable for preparing moist type sausage such as liver sausage.

However, there are other special types of dry sausages, such as Genoa salami, that are prepared by inoculation of the meat emulsion with particular microorganism cultures to promote ingestion of the meat product during the curing process. The encased emulsion is cured under conditions conducive to the growth of desired microorganisms for periods from about 2 to 7 days and dried under controlled temperature and humidity conditions from 2 to 6 months. The conditions which are conducive to the curing and drying of the sausage, however, are also found to result in the growth of undesirable mold and fungi on tubular fibrous cellulosic casings producing cellulolytic enzymes that cause deterioration of the casing and which can render the sausage product unsaleable.

Appearance and surface characteristics of the sausage products are important factors in their commercial acceptance. Changes in these characteristics that may arise during the processing, drying and/or storage are, therefore, highly undesirable even though the changes are only of a surface nature. It is common, for example, for a dry sausage product such as Genoa salami to be encased in a characteristic white, opaque, fibrous casing. The growth of undesirable mold and fungi on the cellulosic casing during processing of the sausage results in minute cracking and flaking of cellulose chips from the surface layer of the casing, a condition commonly referred to as "flaking." While "flaking" defects may be most evident in opaque pigmented casing, it is obvious that the condition would be unsatisfactory for any cellulosic casing.

In accordance with the present invention, there is provided tubular fibrous food casing characterized as being opaque and preferably white opaque and having a coating of cured cationic thermosetting resin bonded to the interior and exterior surfaces thereof in an amount sufficient to afford improved resistance to degradation by cellulolytic enzymes.

There is also provided a method for preparing tubular food casing that exhibits improved resistance to degradation by cellulolytic enzymes which comprises the steps of coating the interior and exterior surfaces of a tubular cellulosic food casing with an amount of a water soluble cationic thermosetting resin sufficient to provide resistance to degradation by cellulolytic enzymes and then curing said resin.

It has been discovered that the tubular cellulosic food casings of the present invention having a cured cationic thermosetting resin coating the surfaces thereof exhibit a surprising and unexpected improvement in resistance to degradation by cellulolytic enzymes and that said casings may be employed in processing sausage products where cellulosic food casings have heretofore proven to be unsatisfactory. Accordingly, a white, opaque fibrous casing prepared in accordance with the practice of the present invention may be employed in the preparation of dry sausages such as Genoa salami under conditions conducive to the formation of cellulolytic enzymes without undesirable changes occurring in the surface characteristics and appearance of the encased food product.

Tubular cellulosic casings including fibrous casing prepared by any one of the methods well known in the art are suitable for use in the casing of the present invention.

Suitable coating materials are the cationic thermosetting resins that are water soluble or water dispersible in the uncured state and can be cured to a water insoluble state. Exemplary of the suitable resins are water soluble cationic-melamine-formaldehyde resins and particularly modified melamine-formaldehyde resins such as those described in U.S. Pat. No. 2,796,362; modified urea-formaldehyde cationic resins as, for example, described in U.S. Pat. No. 2,616,874; the cationic resin which is the reaction product of epichlorohydrin and a polyamide as, for example, described in U.S. Pat. No. 2,926,154; and higher polyalkyleneimines, such as polyethyleneimine.

Other suitable cationic thermosetting resins are described in U.S. Pat. No. 3,378,379.

In accordance with the present invention, it is essential that both surfaces of the casing are coated with a suitable cationic thermosetting resin and though it is preferred that an essentially uniform quantity of the resin is applied to each of the surfaces, it has been found that casings having a wide disparity in the amount of resin present on the two surfaces may be employed.

The quantity of cured cationic thermosetting resin adhered to the surfaces of the casing to impart the desired improvement in resistance to deterioration by cellulolytic enzymes is important. The casing should contain at least about 0.45% by weight and preferably at least about 1% by weight of said cured cationic thermosetting resin. The upper limit of cured resin adhered to the surfaces of the casing has not been found to be critical. However, a quantity of resin greatly in excess of that needed to impart the desired resistance to degradation as, for example, more than about 1.5% to 2.0% by weight, may adversely affect the permeability and other desirable characteristics of the casing.

Tubular food casings of the present invention may be prepared from tubular cellulosic casings, and preferably fibrous casings, made by well known, conventional methods which are then coated on the interior and exterior surfaces thereof with a suitable water soluble cationic thermosetting resin using methods well known in the art. For example, the interior surface of the casing may be coated using the "slugging" technique as described, for example, in U.S. Pat. No. 3,378,379 and the exterior surface thereof may be coated by conventional dip coating methods. The casing may be coated by coating both surfaces thereof simultaneously or, alternatively, by first coating one surface and then the other.

In general, final processing of the resin coated casing requires a drying and/or curing step to convert the cationic resin to a water insoluble state and promote adhesion thereof to the casing.

Preferably, aqueous coating solutions of uncured cationic thermosetting resin are employed, the resin content of which may be at least about 2% by weight and preferably between about 2.5% and 10% by weight. Aqueous coating compositions also containing between about 5% and 15% by weight of glycerine or similar polyols may be advantageously employed in accordance with the practice of the present invention.

The invention is further illustrated by the following examples. Unless otherwise indicated, all parts and percentages are by weight.

EXAMPLE I

A substantial quantity of fibrous food casing about 4 inches in diameter was prepared using conventional methods and the casing was simultaneously coated on the interior and exterior surfaces with aqueous compositions containing various proportions of a water soluble cationic thermosetting resin. The resin used was purchased under the trademark "Kymene 557" from Hercules, Inc. and comprised the reaction product of epichlorohydrin and a polyamide prepared by reacting adipic acid with diethylenetriamine. Each of the coating compositions also contained 10% by weight of glycerine. The coating was applied to the interior surface of the casing by the slugging technique at the same time that the outside surface was coated by dip coating the casing. The coated casing was then dried and the coating cured for about 10 to 15 minutes at 105° to 110°C. The following casing samples were prepared:

Casing A: a fibrous casing without any coating applied.

Casing B: a fibrous casing coated on the interior and exterior surfaces with coating compositions containing 1.0% by weight of cationic thermosetting resin. The casing had a cured resin content of 0.41%.

Casing C: a fibrous casing coated on the interior and exterior surfaces with coating compositions containing 3.0% by weight of cationic thermosetting resin. The casing had a cured resin content of 0.90%.

Casing D: a fibrous casing coated with a composition containing 5.0% by weight of cationic thermosetting resin. The casing had a cured resin content of 0.94%.

Casing E: a fibrous casing coated with aqueous compositions containing 7.0% by weight of cationic thermosetting resin. The resin content of the casing was 1.08%.

Casing F: a fibrous casing having a resin content of 1.40%. The casing was coated with compositions containing 9.0% by weight of cationic thermosetting resin.

The casing samples were exposed to two cellulolytic enzyme solutions having the following compositions:

| Solution A | |
|---|---|
| Trichoderma Viride | 0.226 gms |
| Citric Acid | 14.64 gms |
| Sodium Phosphate | 8.62 gms |
| Distilled Water | make up to one |
| Solution B | |
| Aspergillus Niger | 0.400 gms |
| Citric Acid | 14.64 gms |
| Sodium Phosphate | 8.62 gms |
| Distilled Water | make up to one liter |

Forty-two square inches of casing were immersed in 62 ml of the enzyme solutions and were evaluated for flaking after 24 hours. Summarized in Table I below are the results obtained after 24 hours of immersion in the enzyme solutions.

Table I

| CASING SAMPLE | RESIN CONTENT IN CASING % | FLAKING* Solution A | Solution B |
|---|---|---|---|
| A | — | very poor | very poor |
| B | .41 | very poor | poor |
| C | .9 | poor | slight |
| D | .94 | slight | none |
| E | 1.08 | none | none |
| F | 1.40 | none | none |

*Flaking of cellulose chips from surface of casing.

The results in Table I clearly point out the improvement in resistance of the resin coated casing to degradation by various cellulolytic enzymes.

EXAMPLE II

A white, opaque tubular fibrous cellulosic casing prepared by conventional methods was used in this example. The white, opaque characteristics were obtained by incorporating a food grade titanium dioxide pigment into the viscose from which the casing was prepared.

The interior and exterior surfaces of a substantial length of the fibrous casing were coated using the procedure of Example I with aqueous coating compositions containing 5% by weight of the cationic thermosetting resin of Example I and 10% by weight of glycerine. The casing was dried and the resin cured by heating 10–15 minutes at 105°–110°C. It was determined that the resin content of the casing was about 1% by weight.

A typical Genoa salami emulsion was prepared from pork trim, pork butts, salt, sugar and other spices. The desired microorganisms were added to the meat emulsion and the emulsion was stuffed into a length of the resin coated fibrous casing of this example and a comparable length of uncoated white, opaque fibrous casing.

The encased emulsion samples were placed into a "greening room" where temperature and humidity conditions conducive for the growth of microorganisms were maintained (dry bulb temperature of 70° to 75°F. and a relative humidity of 75 to 80%). After 5 days in the "greening room," the encased sausages were transferred to a drying room maintained at a dry bulb temperature of about 55° to 60°F. and 70% relative humidity where they were dried for 90 days.

The processed, dried sausage encased in both the coated and uncoated fibrous casings exhibited desired flavor characteristics. The resin coated fibrous casing retained its original white, opaque color and there was no evidence of cracking or flaking of the cellulose in the casing. The uncoated white fibrous casing, however, while not exhibiting any apparent flaking had become discolored and quite dark.

EXAMPLE III

Tubular fibrous cellulosic food casing about 4 inches in diameter prepared using conventional methods was used in this Example. An aqueous coating composition containing 10% by weight of the cationic thermosetting resin of Example I was used in the preparation of the following samples.

Casing A: a fibrous casing without resin coating.

Casing B: a fibrous casing coated on the interior surface with the coating composition of this Example by the "slugging" technique and dried for about 10 to 15 minutes at 105° to 110°C.

Casing C: a fibrous casing coated on the exterior surface with the coating composition of this Example by dip coating and then dried 10 to 15 minutes at 105° to 110°C.

Casing D: a fibrous casing coated with the coating composition of this Example on the interior surface by the "slugging" technique and on the exterior surface by dip coating and then dried 10 to 15 minutes at 105° to 110°C.

A cellulolytic enzyme solution of the following composition was employed in evaluating the casing samples:

| Aspergillus Niger | 0.200 gms |
|---|---|
| Citric Acid | 7.320 gms |
| Sodium Phosphate | 4.31 gms |
| Distilled Water | make up to 500 ml. |

The tubular casing samples were longitudinally cut and each was immersed in an open flattened state in the enzyme solution for 65 hours. The casing samples were evaluated for "flaking" after 65 hours of immersion and the results are summarized in Table II.

TABLE II

| CASING SAMPLE | SIDE COATED | FLAKING RESULTS |
|---|---|---|
| A | none | very poor |
| B | interior | poor |
| C | exterior | poor |
| D | both | none |

The results show that coating both sides of the fibrous casing with a cationic thermosetting resin substantially improved the resistance of the casing to degradation by a cellulolytic enzyme.

EXAMPLE IV

A tubular fibrous cellulosic food casing about 4 inches in diameter prepared using conventional method was used in this Example. A series of aqueous coating compositions containing 10% by weight of glycerine was prepared using the water soluble cationic thermosetting resins and quantities thereof described below. Each of the various coating compositions were used to coat both the interior and exterior surfaces of a length of fibrous casing. The interior surface of each length of casing was coated using the "slugging" technique immediately followed by dip coating of the exterior surface of the tubular casing. The coated casing samples were then dried and the coating resin cured for 10 to 15 minutes at 105° to 110°C. The following casing samples were prepared:

Casing A: a fibrous casing without any coating applied to the surfaces.

Casing B: a fibrous casing coated on the interior and exterior surfaces with coating compositions containing 10% by weight of the cationic thermosetting resin of Example I.

Casing C: a fibrous casing coated on the interior and exterior surfaces with aqueous compositions containing 10% by weight of a cationic thermosetting urea-formaldehyde resin sold under the tradename "Parez Resin 615" by American Cyanamid Company.

Casing D: a fibrous casing coated on the interior and exterior surfaces with coating compositions containing 10% by weight of polyethyleneimine, a cationic thermosetting resin purchased under the tradename "Chemicat P-145" from Alcolac Chemical Corporation.

Casing E: a fibrous casing coated on the interior and exterior surfaces with coating compositions containing 10% by weight of a water soluble cationic thermosetting modified melamine-formaldehyde resin sold under the tradename "Accobond 3900" by American Cyanamid Company.

Casing F: a fibrous casing coated on the interior and exterior surfaces with coating compositions containing 5% by weight of the resin of Example I and 5% by weight of a cationic thermosetting urea-formaldehyde resin sold under the tradename "Parez Resin 615" by American Cyanamide Company.

Casing G: a fibrous casing coated on the interior and exterior surfaces with coating compositions containing 5% by weight of the resin of Example I and 5% by weight of the cationic thermosetting polyethyleneimine resin used to prepare "Casing D" of this Example.

Casing H: coating compositions containing 5% by weight of "Kymene 557" (resin of Example I) and 5% by weight of "Accobond 3900" (melamine-formaldehyde resin used in Casing E of this Example) were used to coat the interior and exterior surfaces of a fibrous casing to prepare the casing of this Example.

Casing I: a fibrous casing both surfaces of which were coated with coating compositions containing 5% by weight of the urea-formaldehyde resin of this Example ("Casing C") and 5% by weight of the polyethyleneimine resin of this Example ("Casing D").

Casing J: a fibrous casing with both surfaces coated with coating compositions containing 5% by weight of the urea-formaldehyde resin of this Example ("Casing C") and 5% by weight of the melamine-formaldehyde resin of this Example ("Casing E").

Casing K: a fibrous casing with both surfaces coated with coating compositions containing 5% by weight of the polyethyleneimine resin of this Example ("Casing D") and 5% by weight of the melamine-formaldehyde resin of this Example ("Casing E").

Samples of the various casings of this Example were immersed in cellulolytic enzyme solutions having the same composition as Solution A and Solution B of Example I. After 24 hours of immersion, casing samples B to K, which were coated on both interior and exterior surfaces with a cured cationic thermosetting resin, were found to exhibit no "flaking" or other degradation whereas samples of Casing A, the uncoated fibrous casing, exhibit severe "flaking" after immersion in both enzyme solutions.

What is claimed is:

1. A tubular cellulosic fibrous food casing characterized as being opaque and having at least about 0.45% by weight of a coating of cured cationic thermosetting resin bonded to the interior and exterior surfaces thereof to afford resistance to degradation by cellulolytic enzymes.

2. The tubular casing of claim 1 which is characterized as being white.

3. The tubular casing of claim 1 wherein the cationic thermosetting resin is the reaction product of epichlorohydrin and a polyamide.

4. The tubular casing of claim 1 wherein the cationic thermosetting resin is polyethyleneimine.

5. A food product comprising a dry processed sausage encased in a tubular cellulosic food casing having a cured cationic thermosetting resin coating adhered to the interior and exterior surfaces thereof, the coating resin content of said casing being at least about 0.45% by weight.

6. The food product of claim 5 wherein a fibrous web is embedded in said tubular cellulosic tubing.

7. The food product of claim 5 wherein the dry processed sausage is a Genoa salami which is encased in a white, opaque tubular fibrous casing.

8. The method of preparing a tubular cellulosic food casing that exhibits resistance to degradation by cellulolytic enzymes which comprises the steps of coating the interior and exterior surfaces of a tubular cellulosic food casing with an amount of water soluble cationic thermosetting resin sufficient to afford resistance to degradation of said casing by cellulolytic enzymes and then drying said casing and curing the resin coating applied to the surfaces thereof.

9. The method of claim 8 wherein an aqueous solution containing at least about 2% by weight of said cationic thermosetting resin is employed to coat the surfaces of said tubular casing.

10. The method of claim 8 wherein said cationic thermosetting resin is the reaction product of epichlorohydrin and a polyamide.

11. The method of claim 8 wherein said cationic thermosetting resin is polyethyleneimine.

12. The improved method of preparing a dry sausage the improvement which comprises the step of stuffing a food emulsion into a tubular cellulosic food casing having an amount of cured cationic thermosetting resin bonded to the interior and exterior surfaces thereof of at least about 0.45% by weight.

13. The improved method of claim 12 wherein the cationic thermosetting resin bonded to the surfaces of said food casing is the reaction product of epichlorohydrin and a polyamide.

14. The improved method of claim 12 wherein the cationic thermosetting resin bonded to the surfaces of said food casing is polyethyleneimine.

* * * * *